(12) United States Patent
McGarry et al.

(10) Patent No.: US 8,743,220 B2
(45) Date of Patent: Jun. 3, 2014

(54) SYSTEM AND METHOD FOR ACQUIRING A STILL IMAGE FROM A MOVING IMAGE

(71) Applicant: Cognex Corporation, Natick, MA (US)

(72) Inventors: E. John McGarry, La Jolla, CA (US); William M. Silver, Nobleboro, ME (US)

(73) Assignee: Cognex Corporation, Natick, MA (US)

( * ) Notice: Subject to any disclaimer, the term of this patent is extended or adjusted under 35 U.S.C. 154(b) by 0 days.

(21) Appl. No.: 13/844,947

(22) Filed: Mar. 16, 2013

(65) Prior Publication Data
US 2013/0321657 A1    Dec. 5, 2013

Related U.S. Application Data

(63) Continuation-in-part of application No. 12/559,467, filed on Sep. 14, 2009, now Pat. No. 8,542,281.

(60) Provisional application No. 61/793,625, filed on Mar. 15, 2013.

(51) Int. Cl.
| | |
|---|---|
| *H04N 5/228* | (2006.01) |
| *H04N 9/64* | (2006.01) |
| *H04N 5/225* | (2006.01) |
| *H04N 3/14* | (2006.01) |
| *G06K 9/64* | (2006.01) |
| *G06K 9/40* | (2006.01) |

(52) U.S. Cl.
USPC ............... 348/208.4; 348/248; 348/222.1; 348/308; 348/220.1; 382/260; 382/279

(58) Field of Classification Search
CPC ......... H04N 5/228; H04N 5/225; H04N 9/64; H04N 3/14; H04N 9/40; G06K 9/64; G06K 9/40
USPC .............. 348/208.99, 220.1, 222.1, 308, 248, 348/353, 208.13, 367, 208.4, 297; 82/260, 82/297
See application file for complete search history.

(56) References Cited

U.S. PATENT DOCUMENTS

| | | | |
|---|---|---|---|
| 5,696,848 | A | 12/1997 | Patti et al. |
| 7,120,312 | B2 | 10/2006 | George |

(Continued)

FOREIGN PATENT DOCUMENTS

EP    2067432 A1    6/2009

OTHER PUBLICATIONS

Silver, "Method for System for Dynamic Feature Detection", Aug. 9, 2008, Published in: US.

(Continued)

*Primary Examiner* — Nhan T Tran
*Assistant Examiner* — Marly Camargo
(74) *Attorney, Agent, or Firm* — Loginov & Sicard

(57) ABSTRACT

A system and method captures a moving image of a scene that can be more readily de-blurred as compared to images captured through other methods operating on equivalent exposure-time intervals. Rather than stopping and starting the light measurement during the exposure-time interval, photo-generated current is switched between multiple charge storage sites in accordance with a temporal switching pattern that optimizes the conditioning of the solution to the inverse blur transform. By switching the image intensity signal between storage sites all of the light energy available during the exposure-time interval is transduced to electronic charge and captured to form a temporally decomposed representation of the moving image. As compared to related methods that discard approximately half of the image intensity signal available over an equivalent exposure-time interval, such a temporally decomposed image is a far more complete representation of the moving image and more effectively de-blurred using simple linear de-convolution techniques.

20 Claims, 8 Drawing Sheets

(56) References Cited

U.S. PATENT DOCUMENTS

| | | | |
|---|---|---|---|
| 7,619,656 B2 | 11/2009 | Ben-Ezra et al. | |
| 8,009,197 B2* | 8/2011 | Ben-Ezra et al. | 348/208.1 |
| 2003/0098919 A1 | 5/2003 | Liu et al. | |
| 2005/0237403 A1 | 10/2005 | Baykal et al. | |
| 2006/0119710 A1* | 6/2006 | Ben-Ezra et al. | 348/208.99 |
| 2006/0125938 A1 | 6/2006 | Ben-Ezra et al. | |
| 2007/0258706 A1* | 11/2007 | Raskar et al. | 396/52 |
| 2007/0258707 A1 | 11/2007 | Raskar | |
| 2008/0062287 A1* | 3/2008 | Agrawal et al. | 348/241 |
| 2008/0106625 A1* | 5/2008 | Border et al. | 348/296 |
| 2009/0154823 A1* | 6/2009 | Ben-Ezra et al. | 382/255 |
| 2010/0246989 A1* | 9/2010 | Agrawal et al. | 382/255 |

OTHER PUBLICATIONS

Agrawal, et al., "Coded Exposure Deblurring: Optimized Codes for PSF Estimation and Invertibility", "Computer Vision and Pattern Recognition", Jun. 20, 0009, pp. 2066-2073, Publisher: IEEE, Published in: US.

Raskar, et al., "Coded Exposure Photography: Motion Deblurring Using Fluttered Shutter", "ACM Transaction on Graphics", Jul. 2006, pp. 795-804, vol. 25, No. 3, Publisher: Mitsubshi Electric Research Laboratories.

Ben-Ezra, et al., "Motion-Based Motion Deblurring", "Transactions on Pattern Analysis and Machine Intelligence", Jun. 2004, pp. 689-698, vol. 26, No. 6, Publisher: IEEE.

Banham, Mark R., et al., "Digital Image Restoration", *IEEE Signal Processing Magazine*, 1053-5888/97/910.00, (Mar. 1997), 24-41.

\* cited by examiner

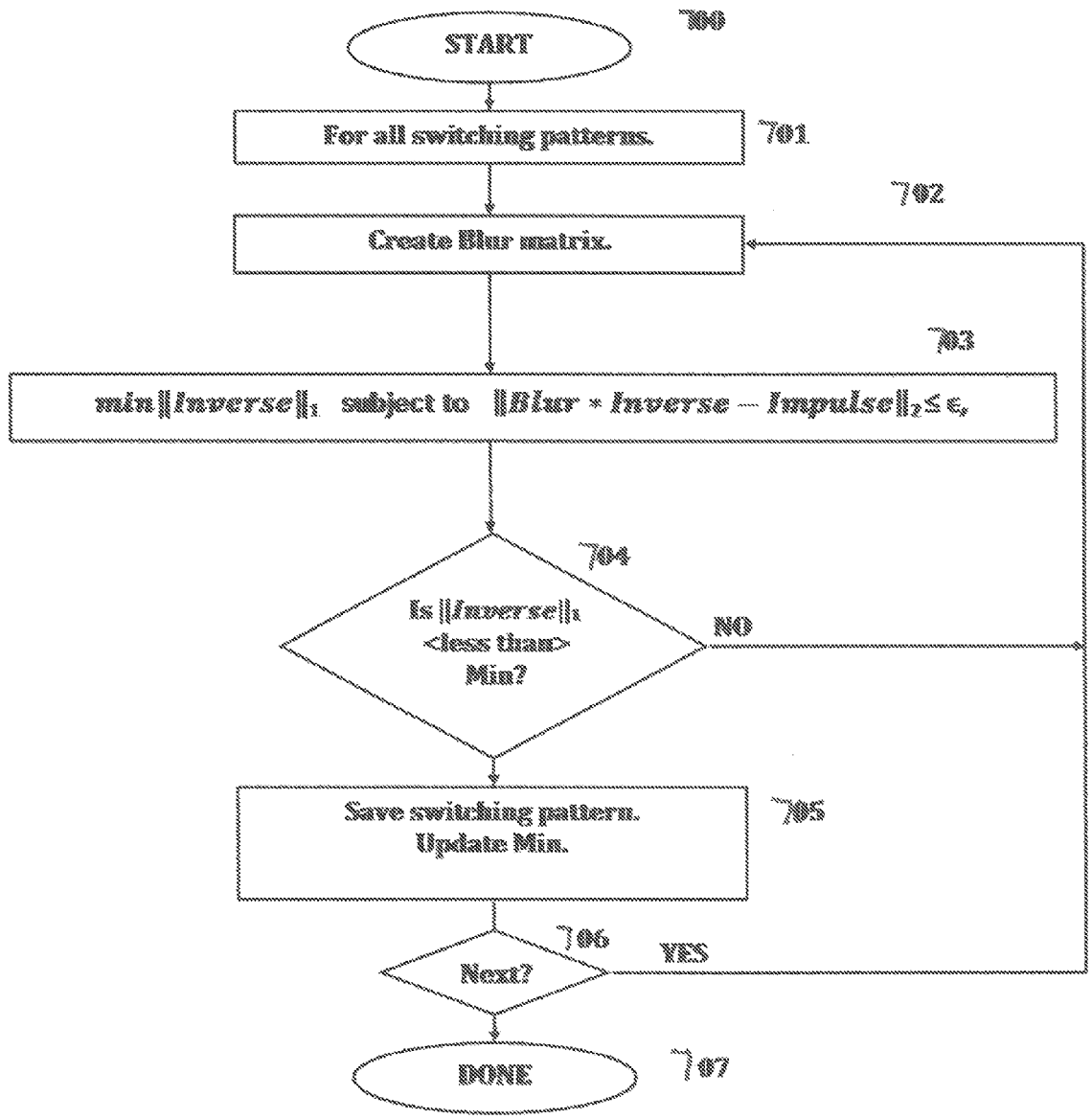

SYSTEM AND METHOD FOR ACQUIRING A STILL IMAGE FROM A MOVING IMAGE

RELATED APPLICATION

This application is a continuation-in-part of co-pending U.S. patent application Ser. No. 12/559,467, entitled SYSTEM AND METHOD FOR ACQUIRING A STILL IMAGE FROM A MOVING IMAGE, filed Sep. 14, 2009, and this application claims the benefit of U.S. Provisional Application Ser. No. 61/793,625, entitled SYSTEM AND METHOD FOR ACQUIRING A STILL IMAGE FROM A MOVING IMAGE, filed Mar. 15, 2013, each of which applications is expressly incorporated herein by reference.

FIELD OF THE INVENTION

This invention relates to systems and methods for acquiring still images from moving images.

BACKGROUND OF THE INVENTION

It is often desirable to capture still images of a moving scene with a camera having an electronic imaging system. Conventional electronic imaging systems include a rectangular image sensor, having an array of electronic pixels, positioned in the focal-plane of a lens to receive an optical image of the scene. Electronic pixels include a photosensitive element that transduces incident light energy into electronic potential. Most pixels operate by providing for electronic charge to accumulate for a period of time in a storage capacitance. Each storage capacitance exhibits a voltage potential that is proportional to the total light energy arriving at the pixel over the exposure time. In an electronic image sensor the exposure time must be long enough to generate pixel output voltages that are sufficiently distinguishable from the effects of noise, so as to capture an image that is a useful representation of the scene.

A distortion in the captured image, commonly known as motion-blur, occurs when there is a movement in the observed scene that forms an optical image with respect to the image sensor during exposure time. Unlike a still image where, ideally, the captured pixel values map uniquely to light emanating from points on observed objects in the scene, in a motion-blurred image, at least some pixel values are a function of the integral of the light intensities emanating from multiple points in the scene during the exposure time interval.

A very common approach to the problem of motion-blur is to shorten the exposure time and thereby marginalize the influence of motion on the captured image. This is a viable approach to the extent that the optical image possesses light energy that is sufficient to satisfy the signal-to-noise constraint noted generally above. This may require the use of impractical amounts of illumination at the scene and/or use of a large lens aperture that adversely affects the image depth of field. If the exposure time can not be shortened sufficiently, an alternative approach is to synchronize the motion of the image sensor with the motion of the imaged scene during the exposure time. This approach works well when a shared external reference frame can be used to facilitate synchronization, as with, for example, the inertial stabilization of image sensors in hand held cameras or the encoder synchronization of time-delay-integration line-scan cameras.

There are, however, applications where the optical image either does not possess sufficient light energy to allow for a short exposure time and/or the motion of the image sensor cannot be practically synchronized with the motion of the optical image. In such applications, capturing an image distorted by some amount of motion-blur (also termed herein a "blur image" or "blurred image") cannot be avoided and a still image can only be achieved through a computational process that uses a de-blurring algorithm to extract a still image representation from the captured image data.

As described above, motion blurring results when light emanating from points on observed objects in the scene that form the optical image move with respect to the image sensor during exposure time. The pattern created in the image sensor by one such point source is known as the point-spread-function (PSF). The collection of point-spread-functions across the image define a blur transform. De-blurring algorithms estimate the blur transform, solve for the inverse blur transform, and apply the inverse blur transform to the captured image data to arrive at a still image.

Theoretically, point-spread-functions could be completely uncorrelated across the image. If this were the case, de-blurring the captured image would be virtually impossible. In practice, de-blurring algorithms make numerous simplifying assumptions. For example, it is common to assume that the point-spread-function is known and/or spatially invariant over the image or large segments of the image.

Even given such simplifications, it may be difficult or impossible to arrive at a good solution for the inverse blur transform. This is because the motion of the image relative to the image sensor over the exposure period operates as a low-pass box-filter that irretrievably destroys (or highly attenuates) significant spatial information. Although it is possible to create an approximate inverse to such a filter, the inverse, due to the fact that it is attempting to reconstruct highly attenuated or lost information, becomes very sensitive to input data, which is known as being ill-conditioned. When the solution to the inverse blur transform is ill-conditioned small changes in the assumption with regard to how the blurred image was formed can lead to errors in the resultant still image, derived from applying the transform solution, that are hugely out of proportion to their apparent magnitude in the captured image. Captured images invariably include a noise term that is independent of the blur transform, and this leads to inaccuracies in the resultant still image. For example, the still image may contain fixed pattern noise or temporal noise. Fixed pattern noise is often due to dissimilarities of transfer gate efficiency or storage capacitance between pixels in the sensor. Temporal noise often occurs due to shot noise in the photodetector or amplifier noise. De-blurring algorithms typically manage this problem by either attempting to filter the independent noise component in the captured image and/or forcing a modification on the point-spread-function that improves the conditioning of the inverse blur transform.

Most de-blurring algorithms do not assume any ability to influence the original blur transform. Such algorithms simply operate, to various extents, with a digital input image and some very general a priori expectations regarding image noise. Such algorithms are, in effect, restricted to attempting to separate the influence of noise from an ill-conditioned solution to the inverse blur transform, which is, in itself, an extremely difficult problem.

It should be noted that the art provides a class of algorithms that are capable of estimating the image motion as input, and this estimate can be employed to aid in deriving a still image by various de-blurring algorithms. For example, Ben Ezra et. al. employ a secondary motion detector to estimate image motion, and employ this estimate to aid in deriving a still image, as described, by way of background in *Motion-Based Motion Deblurring*, Moshe Ben-Ezra and Shree K. Nayar, IEEE TRANSACTIONS ON PATTERN ANALYSIS AND MACHINE INTELLIGENCE, VOL. 26, NO. 6, June 2004.

Other, more-recently developed, de-blurring algorithms incorporate control of the image exposure process. One such algorithm includes the use of multiple exposures, where by the total image exposure time is long enough to achieve good signal-to-noise in the captured image and the induced modification of the point-spread-function leads to an inverse blur transform that is optimal in terms of conditioning. A method for finding such a multiple exposure pattern includes evaluating various exposure patterns until the pattern that results in a sufficiently small condition number in the inverse blur transform is found. The multiple exposure process itself includes repeatedly stopping and starting the integration of light measurement over an exposure-time interval. A description of one such method is given in U.S. Published Patent Application No. 2007/0258706 A1, entitled METHOD FOR DEBLURRING IMAGES USING OPTIMIZED TEMPORAL CODING PATTERNS, by Raskar, et al., and related applications thereto, the teachings of which are expressly incorporated herein by reference as useful background information.

One disadvantage of the method described above is that for the modified point-spread-function to have a substantial influence on the conditioning of the inverse blur transform, it should incorporate numerous exposure activation periods of varying duration separated by a similar set of exposure deactivation periods. As the size of the point-spread-function grows, so do the chances that one or more simplifying assumption may be violated. For example, it is common to expect the velocity of the scene, or of objects in the scene, to be constant over the exposure period—as the duration of the period is relatively short and change may occur in a longer time than the duration of the exposure period. As the duration of the exposure time increases the robustness of a constant velocity assumption decreases. With a large point-spread-function the inverse blur transform is more influenced by boundary conditions, meaning that it is more dependent on the state of pixels that are outside the field-of-view of the captured image, as compared to a smaller point-spread-function. In addition, the accurate de-blurring of objects in the scene having a different velocity than their immediate surroundings may be restricted by the relative size of the point-spread-function, since the spatial invariance simplification will be violated on a boundary that is related in size to the point-spread-function. That is, the point-spread-function is not consistent for elements of the image that are not moving versus elements that are moving, and thus, a point-spread-function that applies to a smaller-neighborhood is desirable to reduce the effects of boundary conditions.

Another disadvantage to certain prior art deblurring algorithms, and particularly those employing intermittent starting and stopping of integration, is that the amount of light in a given exposure period is reduced. The lens aperture must generally be increased to satisfy the signal-to-noise constraints of the sensor, thereby providing sufficient light to the sensor to form an acceptable image within the integration period. Increasing the aperture can adversely affect the depth of field of the imaging system.

A system capable of capturing a readily de-blurred image of a moving scene while operating on a significantly shorter time interval, as compared to known methods, would be desirable. The ability to capture such an image employing a reduced aperture for enhanced depth of field is also desirable.

SUMMARY OF THE INVENTION

This invention overcomes the disadvantages of prior art known methods for capturing a moving image. Such known methods for capturing a moving image that can be more readily de-blurred as compared to images captured using typical techniques include capturing a multiple exposure image by repeatedly starting and stopping the integration of light intensity measurement over an exposure-time interval. This can be accomplished by various methods, including modulating an electronic shutter in a temporal pattern selected to improve the conditioning of the solution to the inverse blur transform of the captured image. Such multiple exposure patterns are characterized by an irregular sequence of integration and non-integration periods over the exposure-time interval, the total amount of integration time and non-integration time being approximately equal.

According to an illustrative embodiment, the system and method captures a moving image of a scene that can be more readily de-blurred as compared to images captured through the above-referenced and other known methods operating on an equivalent exposure-time interval. Rather than stopping and starting the integration of light measurement during the exposure-time interval, photo-generated current is switched between multiple charge storage sites in accordance with a temporal switching pattern that optimizes the conditioning of the solution to the inverse blur transform. By switching the image intensity signal between integrating storage sites substantially all of the light energy available during the exposure-time interval is transduced to electronic charge and captured to form a temporally decomposed representation of the moving image. As compared to related methods that discard approximately half of the image intensity signal available over an equivalent exposure-time interval, such a temporally decomposed image is a far more complete representation of the moving image and more effectively de-blurred using known and typically straightforward linear de-convolution techniques.

In an illustrative embodiment a system and method for acquiring a still image from an input moving image, provides an imaging assembly including a plurality of pixels. Each of the pixels comprises a photosensitive element and a plurality of integrating storage sites, and each of the pixels is constructed and arranged to direct a measurement of light impinging on the photosensitive element to any one of the plurality of integrating storage sites. An image capture process forms a temporally decomposed representation of the moving image in an exposure time interval by repeatedly switching the measurement of light impinging on each of the photosensitive elements among the plurality of integrating storage sites according to a temporal switching pattern. An image extraction process operates on the temporally decomposed representation of the moving image to extract the still image. The photosensitive element is illustratively a photodiode connected to a first sense node through a first transfer gate and to a second sense node through a second transfer gate, and each of the first transfer gate and the second transfer gate are responsive to the input image capture process. The temporal switching pattern can be selected to (a) minimize attenuation of spatial frequencies in the temporally decomposed representation of the moving image; (b) minimize attenuation of spatial frequencies in the still image; (c) provide a still image that contains a filtered set of spatial frequencies; and/or (d) provide a still image having reduced blur.

In an illustrative embodiment, the image extraction process is constructed and arranged to provide a point-spread-function having a plurality of coefficients based upon a linear combination of values stored in the each of the plurality of integrating storage sites. A blur matrix is provided based upon the point-spread-function. This blur matrix is illustratively based upon a best version of the temporal switching pattern in terms of the residual error and the condition number. The system and method cycles through a plurality of candidate temporal switching patterns in order to identify the one with the minimal residual error and condition number values. This is chosen as the best temporal switching pattern.

Additionally, the moving image can be acquired from a moving object or scene operatively connected with an encoder that provides a signal related to movement of the object or scene, and the temporal switching pattern can be computed based upon the signal. An object-height detection assembly can also be operatively interconnected between the encoder and an image switch signal generator to modify the temporal switching pattern based upon the actual height of the object and its associated proximity to in image sensor.

BRIEF DESCRIPTION OF THE DRAWINGS

The invention description below refers to the accompanying drawings, of which:

FIG. 7 is a flow diagram showing a procedure for finding the best temporal switching pattern for the point-spread-function, in accordance with the illustrative embodiment.

DETAILED DESCRIPTION

Figure 1:
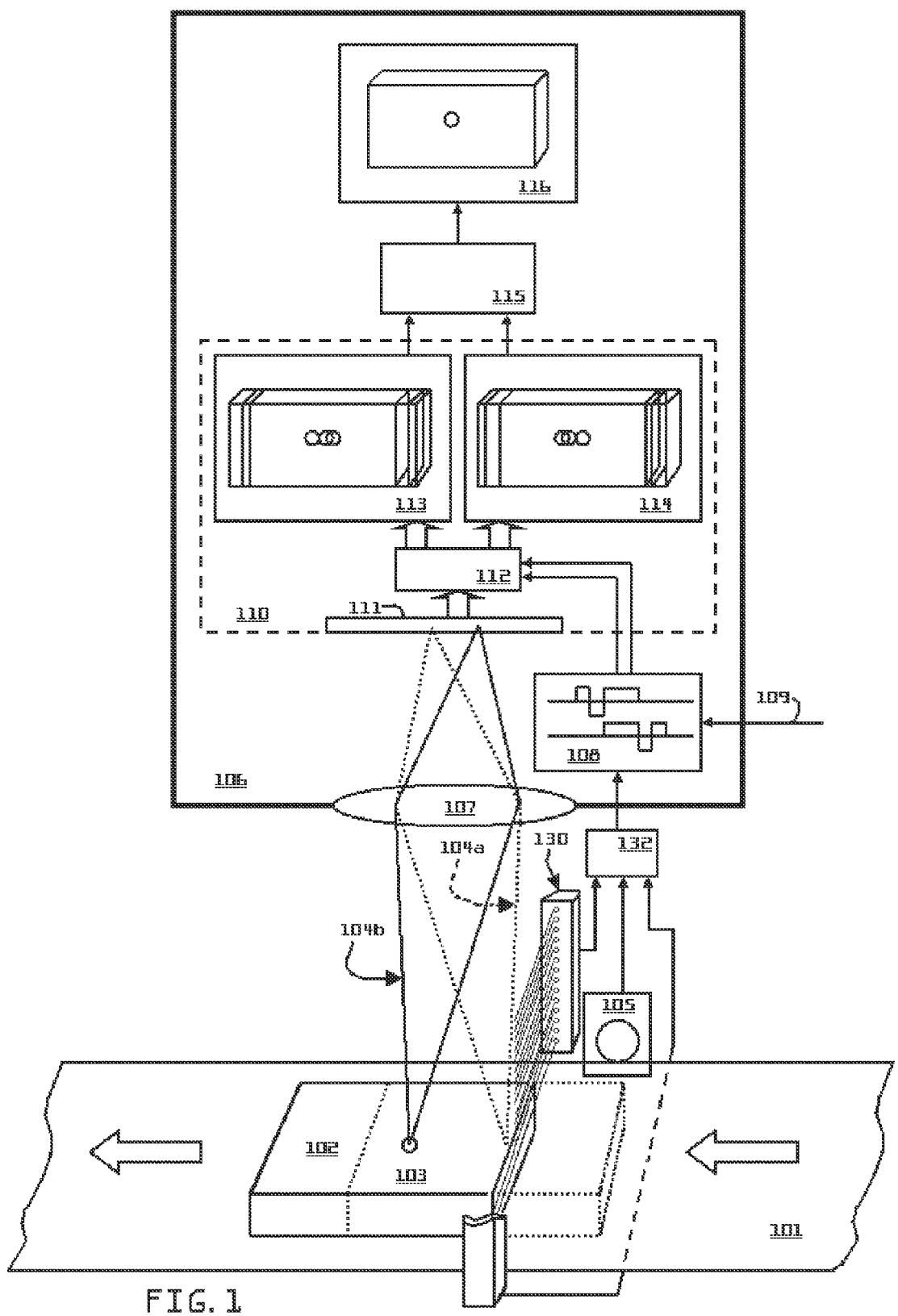
FIG. 1 is a diagram of a system and method for capturing a still image from a moving image including a camera and associated functional components acquiring an image of an exemplary object moving through its field of view on an exemplary conveyor.

FIG. 1 shows schematic camera 106, representative of one illustrative embodiment of the present invention. Camera 106 is focused on a point 103 of object 102, which rests on moving conveyor 101. Camera 106 includes lens 107, image switch signal generator 108, image sensor 110, image processor 115, and image storage buffer 116. Image sensor 110 includes a light intensity transducer 111, an image switch 112, an integrating image-storage buffer 113, and another integrating image-storage buffer 114.

Figure 5:
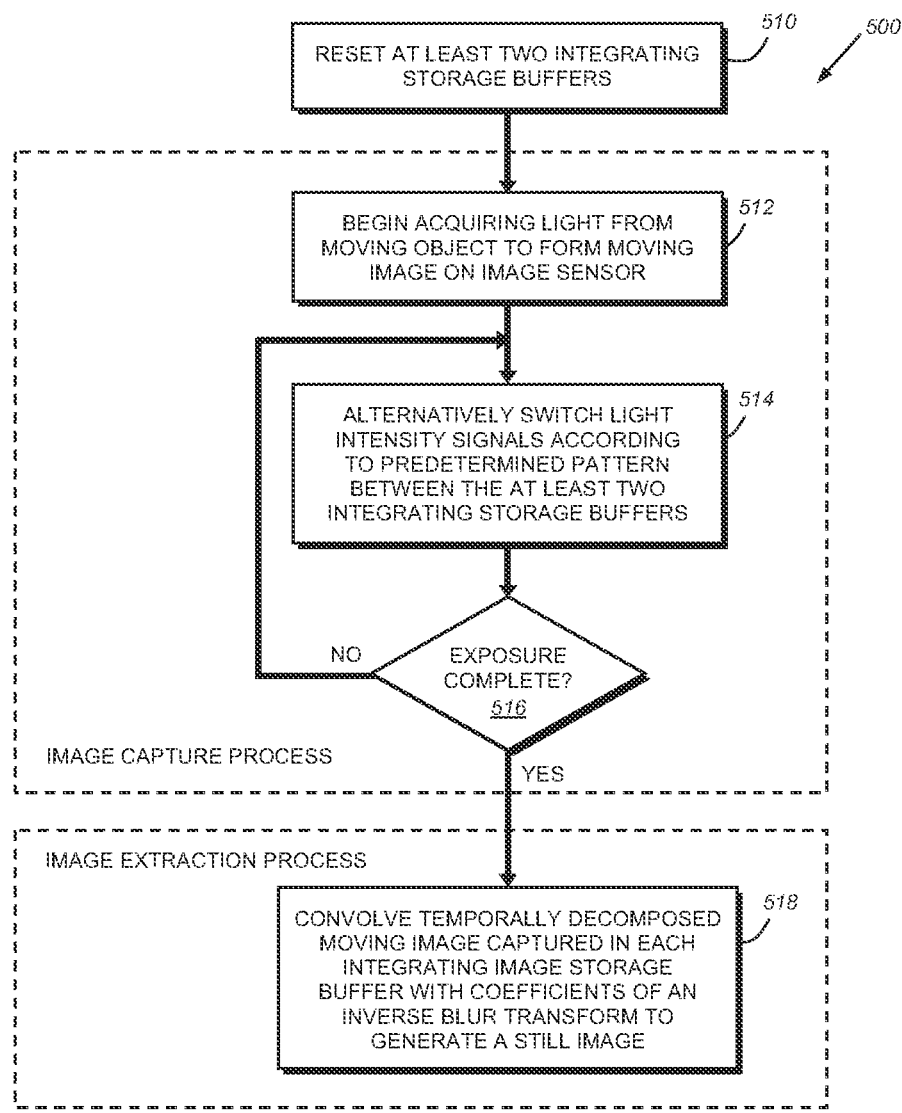
FIG. 5 is a flow diagram showing the overall procedure for acquiring a still image from a moving image in accordance with an illustrative embodiment.

In operation, and with further reference to the flow diagram showing the overall procedure 500, prior to the exposure-time interval, integrating image-storage buffers 113 and 114 (or equivalent integrating storage sites) are reset (step 510). The process 500 then initiates an image capture process as shown by the dashed box in FIG. 5. During the exposure-time interval, some of the light reflected from moving object 102 is collected by lens 107 and focused to form a moving image on the focal plane of image sensor 110 (step 512). As defined herein, a "moving image" is a three-dimensional representation of the object within the image sensor in which the third dimension is the exposure time and the image exhibits spatial changes with respect to time. In the depicted scenario of FIG. 1, the motion of the object 102 over the exposure time of the sensor 110 causes the creation of a moving image. However, a variety of alternate scenarios can cause creation of a moving image.

Light from the moving image is converted by light intensity transducer 111 into an array of electrical signals proportional to incident light intensities. The transducer can be organized as an array of electronic "pixels", arranged in either a one-dimensional or two-dimensional configuration. Instantaneous or near-instantaneous measurements of light impinging upon the photosensitive elements of each of the pixels in the transducer 111 (the term "instantaneous" herein taking into account delays based upon inherent electronic and quantum effects) provide a photocurrent that is directed as a signal among any of the integrating storage sites/buffers 113 and 114 depending upon the state of the transfer gates. Thus, the light intensity signals output by light intensity transducer 111 are switched repeatedly in parallel, by image switch 112, between integrating image-storage site/buffer 113 and 114, in accordance with the temporal switching pattern input from image switch signal generator 108 over the exposure time interval (step 514). In this manner, the moving image is temporally decomposed between at least two integrating storage sites or buffers. The temporal switching pattern (or simply, "switching pattern") is optimized, being typically computed as described in accordance with FIG. 3 below. An optional shaft encoder 105, or other motion-sensing device is operatively connected with the conveyor belt (and/or drive mechanism), and a trigger signal 109 may be provided to synchronize image switch signal generator 108 with moving object 102.

When image exposure is complete (decision step 516), image processor 115 operates an image extraction process (dashed box in FIG. 5) that convolves the temporally decomposed representation of the moving image captured in integrating image-storage buffer 113 and 114 with coefficients of the inverse blur transform to extract and form a still image in image storage buffer 116 (step 518). This "still image" desirably defines a two-dimensional image where the time dimension of the exposure has been collapsed or minimized so as to render the result sufficiently de-blurred.

Figure 2:
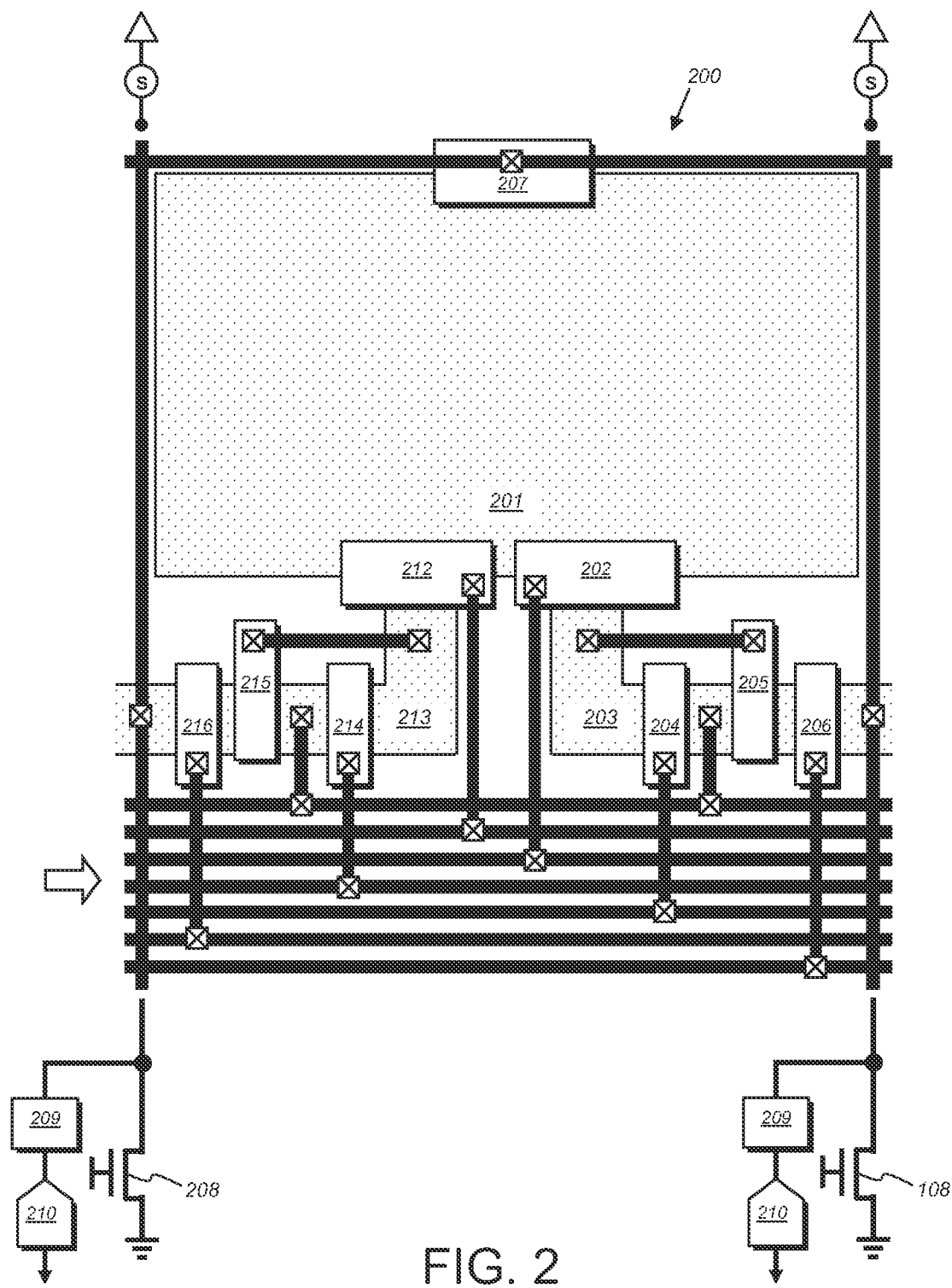
FIG. 2 is a block diagram representing one electronic pixel of image sensor of the illustrative camera of FIG. 1.

FIG. 2 is a block diagram representing one electronic pixel of image sensor 110 according to an illustrative embodiment. Pixel 200 includes, a photosensitive element in the form of a pinned photodiode 201, two transfer gates 202 and 212, two floating diffusion nodes 203 and 213, two reset transistors 204 and 214, two source-follower transistors 205 and 215, two read-select transistors 206 and 216, and one anti-blooming transistor 207. A double-sampling amplifier 209 samples the pixel output voltage at transistor 208, once when diffusion 203, 213 is in the reset state and once after diffusion node 203, 213 is charged by pinned photodiode 201. The difference of the two voltages is computed (i.e. double-sampled) to arrive at a corrected pixel output voltage. The corrected output voltage is digitized by analog-to-digital converter 210 so as to provide a digital intensity value for the pixel.

Pinned photodiode 201 corresponds to one discrete photosensitive element (transducer) of the overall row-and-column pixel array of the image intensity transducer 111. Pinned photodiode 201 converts incident light energy into photocurrent proportional to the light intensity. Together transfer gates 202 and 212 correspond to one switch of image switch 112.

Floating diffusion nodes 203 and 213 each correspond to one storage site of integrating image-storage buffer 113 and 114, respectively.

During the image exposure time interval the image switch signal generator 108 drives all transfer-gates 202 and 212 of image sensor 110, repeatedly turning each of the two transistors on and off according to a predetermined pattern. In typical operation, the exposure-time switching pattern is complementary (i.e. when one transfer gate is on the other is off). Note that a time interval may also exist when both gates are on or off during the switching process, which may be ignored by the processor hardware and software.

The switching pattern can be governed by a variety of factors. Switching is desirably configured to allow a given object feature to be acquired fully within the switching interval—i.e. without loss of feature information. For example, where a feature is one pixel wide in the captured image, it may be desirable to provide a switching interval that changes during object or scene motion of a half pixel distance or less. Where the feature is several pixels wide, then the switching interval can change after more than one pixel distance of object motion. An exemplary feature that can be imaged in accordance with an illustrative embodiment is a barcode pattern in which the code elements may vary by a pixel distance or less, thus making a shorter switching interval desirable.

Briefly described, after image exposure, the charge accumulated in floating diffusion node 203 is primarily the result of photocurrent generated by photodiode 201 when gate 202 was open, while the charge in floating diffusion node 213 was accumulated when transfer gate 212 was open. In the illustrative embodiment, voltage potentials on floating diffusion nodes 203 and 213 are digitized by image processor 115 and convolved with coefficients of the inverse blur transform to form a digital representation of the still image that is stored in image buffer 116.

Figure 4:
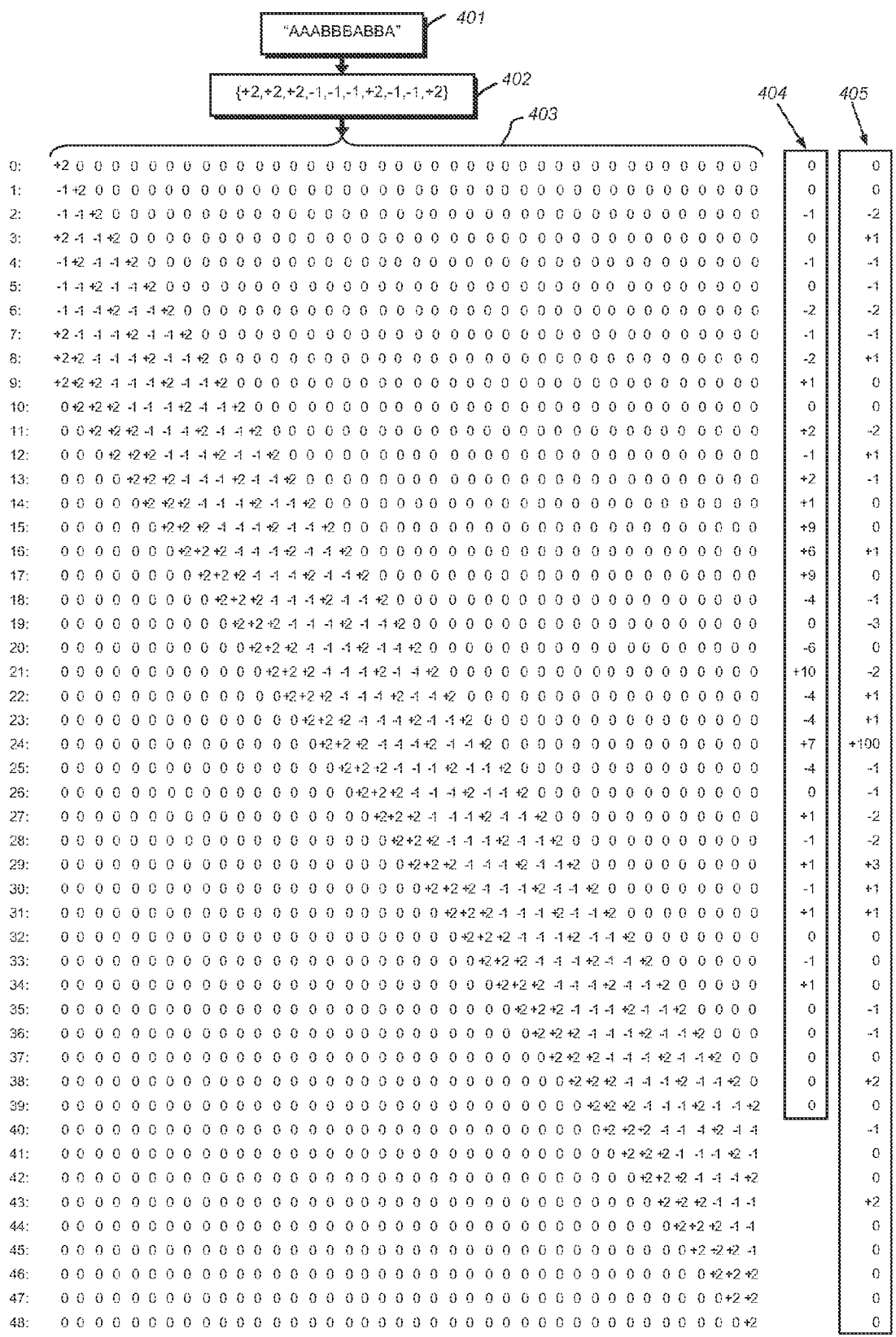
FIG. 4 is a diagram showing an illustrative solution for an inverse blur transform used in conjunction with the illustrative system and method.

FIG. 4 is a diagram showing an exemplary solution for an inverse blur transform for use in computing a still image from a moving image in accordance with the illustrative embodiment. For a given amount of light intensity, the image formed on image sensor 110 will move a pixel distance that is proportional to the required exposure time. By way of an example, it is assumed that the image moves a distance of 10 pixels along the row axis of the image sensor during the exposure time interval. In this case the point-spread-function will have a length of 10 pixels. Assuming that the image velocity is constant over the exposure time, then incident light from any and every single point in the scene will be divided evenly between 10 contiguous horizontal pixels. Let the symbol "A" represent integrating storage buffer 113, let the symbol "B" denote integrating storage buffer 114, and let the switching control pattern be described by an array consisting of some number of symbols "A" and an equal number of symbols "B". For this example let the switching control be defined by the pattern 401 "AAABBBABBA". The point-spread-function is created by linear combination of the contents of integrating storage buffer 113 with the contents of integrating storage buffer 114. Although in theory any coefficients are possible, it has been determined through practice that for a balanced switching pattern such as 401 "AAABB-BABBA", where the captured image is distributed equally between two storage buffers, the coefficients 2 and −1 yield good results. Therefore, in this example switching pattern 401 "AAABBBABBA" yield point-spread-function 402 {+2, +2, +2, −1, −1, −1, +2, −1, −1, +2}. Assuming zero boundary condition, the point-spread-function 402 is padded with zeros and expanded to form the depicted Toeplitz blur matrix 403. The blur transform is computed by solving for the coefficients 404 that provide the minimum RMS residual error fit (step 305 below) to an impulse function, which in this example is scaled by 100-times (100×) to facilitate a fixed point implementation of the de-blurring process. The current result 405 of the multiplication of the blur matrix 403 with the blur transform coefficients 404 is shown as column 405, which is the impulse response scaled by 100-times.

More generally, an explanation of fundamental algebraic spatial image reconstruction techniques can be found by way of useful background in *Digital Image Processing*, by William K. Pratt, John Wiley & Sons, 1978. This text provides a complete survey of classical image reconstruction techniques that should be familiar to those of ordinary skill.

In summary, an applicable technique in accordance with an embodiment is described as:

In conventional notation the reconstruction problem is stated:

$$B=AX+E$$

By way of explanation of the above equation, the acquired "blurred" image B is decomposed as product of the "true" image X multiplied by the blur matrix A plus an acquisition error matrix E. This implies that if one knows the blur matrix A, it is possible to solve for the "true" image X, as follows.

$$X=A'B-A'E$$

One goal, given some limited a priori knowledge regarding the composition of the error matrix E, is to render A' (the inverted blur matrix) less likely, when multiplied by E, to dominate A'B in the solution for the true image X. This is achieved in the manner described further below.

Unlike the various traditional image reconstruction techniques described in Pratt above, the construction of the illustrative blur matrix is not limited to positive values, and, instead, includes both positive and negative coefficient values. This is made practical by way of the high speed temporal decomposition of the point-spread-function enabled by the illustrative switching technique herein.

It has also been observed that a beneficial influence on the error term A'E can be obtained as a result of forming the blur matrix A with both positive and negative values. The benefit can be observed in the conditioning of the solution for A' which is indicative of lower sensitivity to high frequency noise associated with typical forms of image acquisition error.

Figure 3:
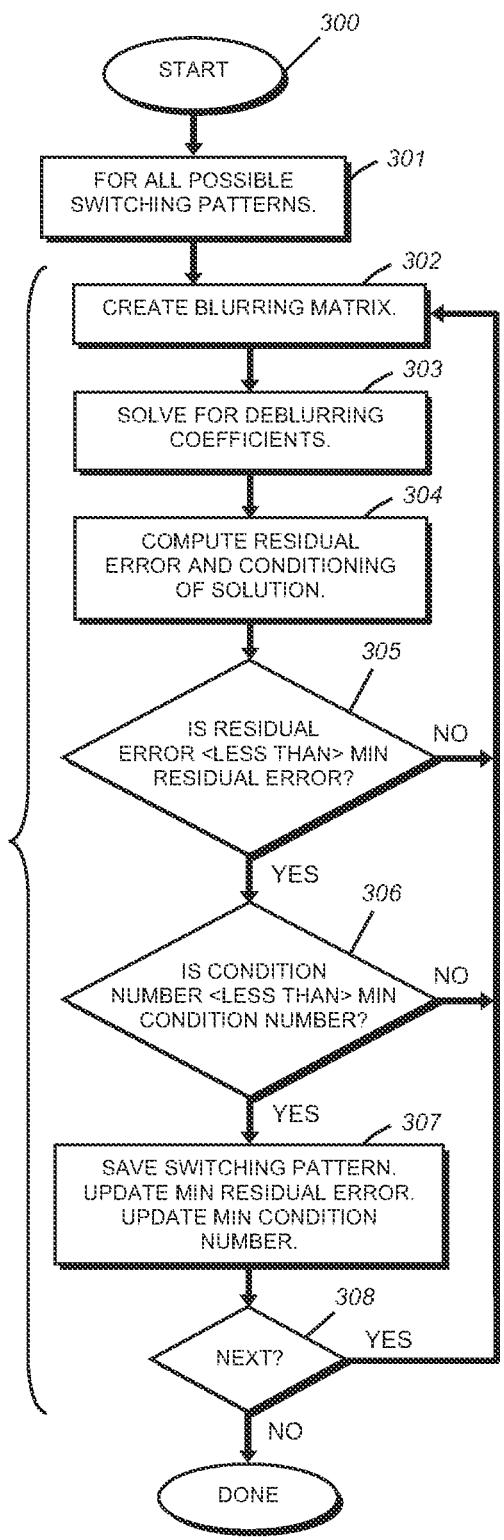
FIG. 3 is a flow diagram of a procedure for finding the best switching pattern for a point-spread-function of known length for use in the illustrative system and method.

FIG. 3 is a flow chart depicting a method 300 for finding the best temporal switching pattern for the point-spread-function (for example, above-described PSF 402) of known length. As in the example above, assume that the image is known to move a distance of 10 pixels during the exposure time and that the switching pattern should be balanced, so as to evenly distribute the integration of incident light measurement between two integrating storage sites/buffers. The best switching pattern will be the pattern that provides for the best solution to the inverse blur transform, in terms of the condition number and residual error. One method for finding such a switching pattern includes initiating an outer loop 301 that cycles through all possible switching patterns consistent with the length and balance constraints. Briefly, within outer loop 301: step 302 uses the candidate switching pattern to generate a blur matrix; step 303 solves for the blur transform coefficients; step 304 computes the condition number and residual error of the solution; decision steps 305 and 306 compare the current residual error and condition number to the previously existing minimum values to determine if the current switching pattern represents a better solution. If a better solution is found, then the switching pattern along with the residual error and condition number metrics are saved in step 307, and outer loop 301 continues via decision step 308 until all switching patterns have been evaluated. When all patterns have been evaluated, the method returns the best pattern from step 307 via decision step 308.

By way of further background, the condition number is known in the art as the sensitivity of the solution to noise. A solution with a low condition number is said to be well-conditioned, while a solution with a high condition number is said to be ill-conditioned. This number can be computed by known techniques.

It has been observed that the above-described technique for computing a de-convolution kernel provides for a more-limited-neighborhood (i.e. less than the entire image data available) de-convolution kernel that results in lower residual error for less computational effort and, generally, three-times or better conditioning, as compared to a similar solution based on a binary exposure coding pattern of similar size. The switching pattern can be computed for each object or scene passing through the sensor's field of view as described above, or can be computed more-intermittently, where objects are likely to exhibit the same velocity and feature characteristics, with the previously computed switching pattern being stored and reused with each image capture and image extraction process.

The size of the point-spread-function (based upon pixel distance or other measurement units) is computed using a variety of techniques. Typically, the size is computed based upon the velocity of the object or scene. Based upon the velocity, the number of pixels passing a point in a given exposure time can be computed. Typically, the velocity is computed by (a) reading the encoder 105, (b) by a predetermined estimation of velocity and/or or (c) by employing an image-based determination of object motion. A number of algorithms exist in the art for estimating motion of an object using captured image data. For example, a conventional implementation of a Kalman filter can be employed to predict the prevailing object speed, based upon the change in the position of predetermined image data versus time in the period preceding the application of the Kalman filter computation. In yet another implementation, the motion of the belt or object can be read based upon dynamic feature detection. That is, the variations in the surface geometry of the belt or object adjacent to the features of interest (for example, defects in the object or belt surface, print features, grain boundaries, etc.) can be employed to define a prevailing speed of the object through the camera field of view. A description of dynamic feature detection is provided in commonly assigned U.S. patent application Ser. No. 12/100,100, entitled METHOD AND SYSTEM FOR DYNAMIC FEATURE DETECTION, filed Aug. 9, 2008, by William M. Silver, the teachings of which, along with the and other incorporated US Patent applications therein, are expressly incorporated herein by reference as useful background information. The point spread function can be otherwise defined as a constant value based upon previously known information about object features and motion.

As described generally above, the computation of an optimized temporal switching pattern can take into account one or more goals. In general, a disadvantage of prior image deblurring techniques is that they result in attenuation of spatial frequencies that may cause the loss of needed information in the resulting still image. Thus, the temporal switching pattern should be selected for a variety of reasons. One is to minimize attenuation of spatial frequencies in the temporally decomposed representation of the moving image so information will be retained in the still image. The image extraction process can also minimize the attenuation of spatial frequencies in the still image. Likewise, the image capture process and the image extraction process can provide a still image that contains a filtered set of spatial frequencies. As another goal, the image capture process and the image extraction process can provide a still image having reduced blur.

Using an encoder or other physical measurement of instantaneous (or near-instantaneous) velocity, it is also contemplated that the switching pattern can be computed based upon the actual velocity curve for increased accuracy. For example, instantaneous velocity of the object or scene is known, movement of pixel distance per-unit-time can be computed and the switching interval can thereby be determined to ensure appropriate correspondence of the switching between storage sites with the motion of object features in the moving image in the presence of a varying velocity profile (such as acceleration or deceleration of conveyor belt 101).

It is contemplated that the height of the object 102 can vary, and thereby affect the relative pixel distance if features. This, in turn, affects the computation of the temporal switching pattern. For example, the features of a closer object to the sensor appear larger and occupy a greater pixel distance than a further-away object. Thus, the encoder 105 can operate in conjunction with an optional object-height-detection assembly 130 (FIG. 1) according to an illustrative embodiment. A variety of known mechanisms can be employed to determine object height including depicted light curtain in which the reflected or transmitted beams determine the approximate height of the object's camera-facing surface. Alternate height detection mechanisms can include sonar devices and optical range finders. A scaling processor 132 receives inputs from the height-detection assembly and the encoder, and modifies the input signal to the image switch signal generator 108 to account for the detected height of the object so that the switching pattern is modified in view of the actual pixel distance versus object motion.

It should be noted that the use of an encoder or other movement measurement device operatively connected to the object or scene can be applied to more-conventional shutter coding or image modulation arrangements according to an embodiment. Illustratively, a system and method for extracting a still image from a moving image of a moving object or scene acquired by a sensor entails the switching the light impinging on a photosensitive element of each of a plurality of pixels of the sensor reflected from the moving object or scene so as to modulate photocurrent integrated by a storage site according to an optimal temporal switching pattern during an exposure time to generate an encoded image. The temporal switching pattern is computed by reading the movement signal provided by the encoder or other operatively connected movement sensing device so as to derive a relatively contemporaneous measurement of object motion. In this embodiment, the switched intervals can alternate between storing the intensity value in an integrating buffer and discarding or ignoring the intensity value. A processor then decodes the encoded image according to an inverse of the temporal switching pattern to provide a still image.

Figure 6:
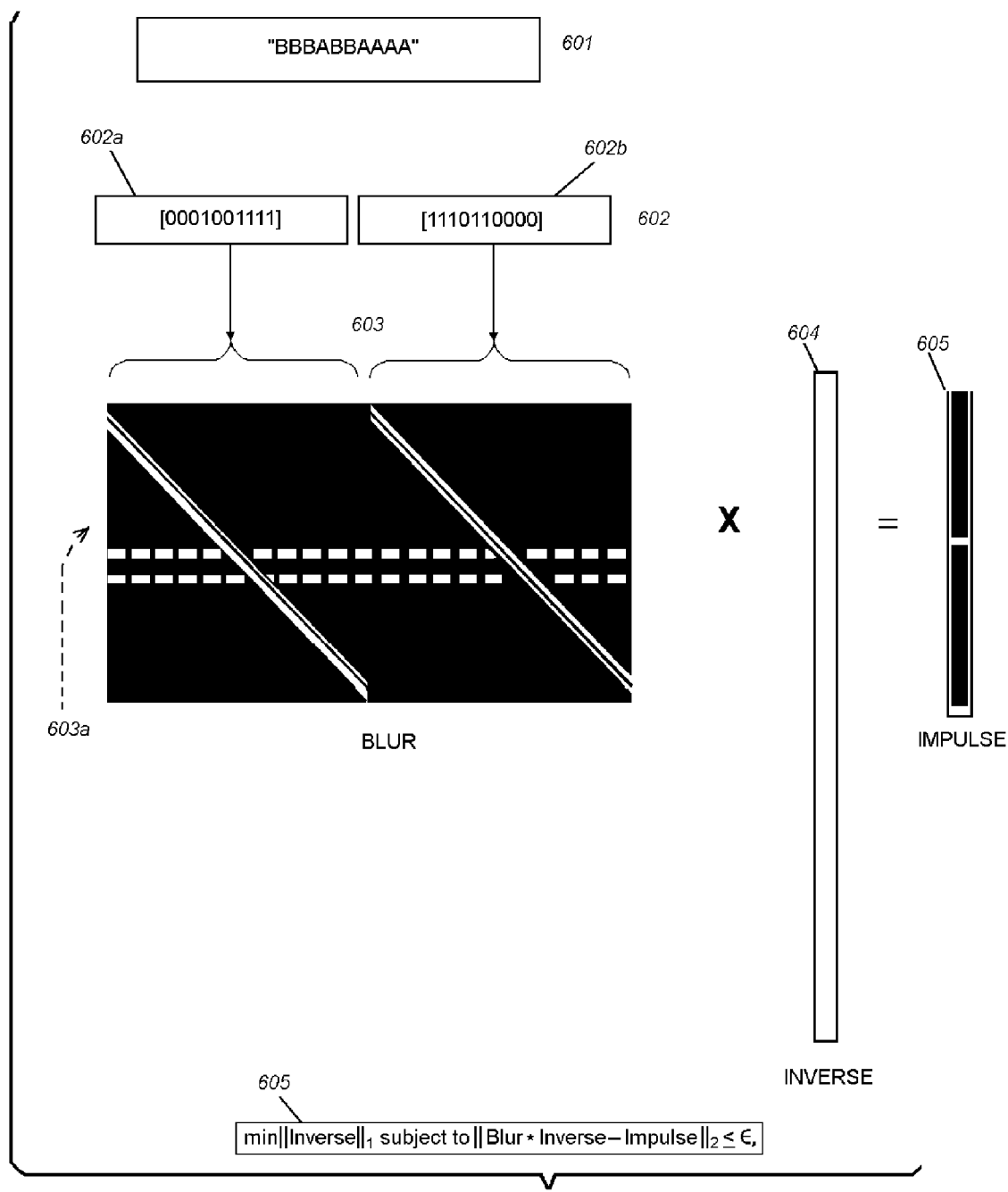
FIG. 6 is a diagram showing an illustrative solution for an inverse blur transform for use in computing a still image from a moving image, in accordance with an illustrative embodiment.

FIG. 6 is a diagram showing an illustrative solution for an inverse blur transform for use in computing a still image from a moving image, in accordance with an illustrative embodiment. For a given amount of light intensity, the image formed on the image sensor (for example 110 in FIG. 1) will move a pixel distance that is proportional to the required exposure time. By way of an example, it is assumed that the image moves a distance of 10 pixels along the row axis of the image sensor during the exposure time interval. This value is exemplary in alternate implementations. In this illustrative case, the optical point-spread-function will have a length of 10 pixels. Assuming that the image velocity is constant over the exposure time, then incident light from any and every single point in the scene will be divided between 10 contiguous horizontal pixels. With reference to FIG. 6, let the symbol "A" represent a first integrating storage buffer (for example 113 in FIG. 1) and let symbol "B" denote a second integrating storage buffer (for example 114 in FIG. 1). Further, let the switching control pattern be described by an array consisting of some number of symbols "A" and a number of symbols "B". For this example, the switching control is defined by the pattern 601 "BBBABBAAAA". The switching pattern temporally decomposes the moving image into a 3-dimensional tensor having the height and width of the image pixel array and depth of two elements. The first element of the depth mode is an image matrix formed by temporal sampling according to pattern 602a [0001001111] and the second element of the depth mode is a second image matrix formed by sampling according to pattern 602b [1110110000]. Assuming zero boundary condition, the point-spread-function 602 is padded with zeros and expanded to form a blur tensor, which is unfolded about mode-1 to form the blur matrix, depicted in 603 as black representing zeros and white representing ones. Note that the entire blur 603 is shown. However, in application, only 1 row is taken, as shown by the dotted-line box 603a indicating a single row that is analyzed at a time. In runtime operation, the system performs the exemplary inverse blur transform row-by-row until the entire image has been processed.

It should be clear to those of skill that the problem illustrated in FIG. 6 is "underdetermined", meaning that there are more unknowns than there are equations to solve for the unknowns. In general, this means that there can be infinitely many exact solutions to the inverse blur. However, although many exact solutions exist, some solutions are better than others. In a practical implementation of the present invention, conditioning of the solution to the inverse blur is of paramount importance because all image sensors induce some amount of additive noise, which is substantially random in nature and therefore cannot be perfectly accounted for in the image reconstruction process. Such additive image sensor noise can be greatly amplified in the image reconstruction process by a poorly conditioned inverse blur function, rendering the de-blurred image extremely noisy in terms of the prevailing signal-to-noise ratio.

To avoid the foregoing problem of additive noise inherent in all image sensors, the illustrative system and method compute the inverse blur by searching for the coefficients 604 in accordance with the statement 605. It is desirable to minimize the L1-norm $(\min\|Inverse\|_1)$ of the inverse blur 604, subject to the constraint that the L2-norm $(\|Blur*Inverse-Impulse\|_2 \leq \epsilon)$ of the residual error remain below some minimum value epsilon. The minimum value epsilon ($\epsilon$) is chosen in accordance with the expected level of image sensor noise. The L1-norm and L2-norm are computed using techniques known to those skilled in the art to solve for the unknowns. The L1-norm and L2-norm provide the total length of all vectors in a vector space or matrix. The forgoing solution can be performed by interior points methods or other methods known to those skilled in the art. The statement 605 is one column of output that, when combined with the analysis for each row of the image 603, provide the overall desired result.

Figure 6A:
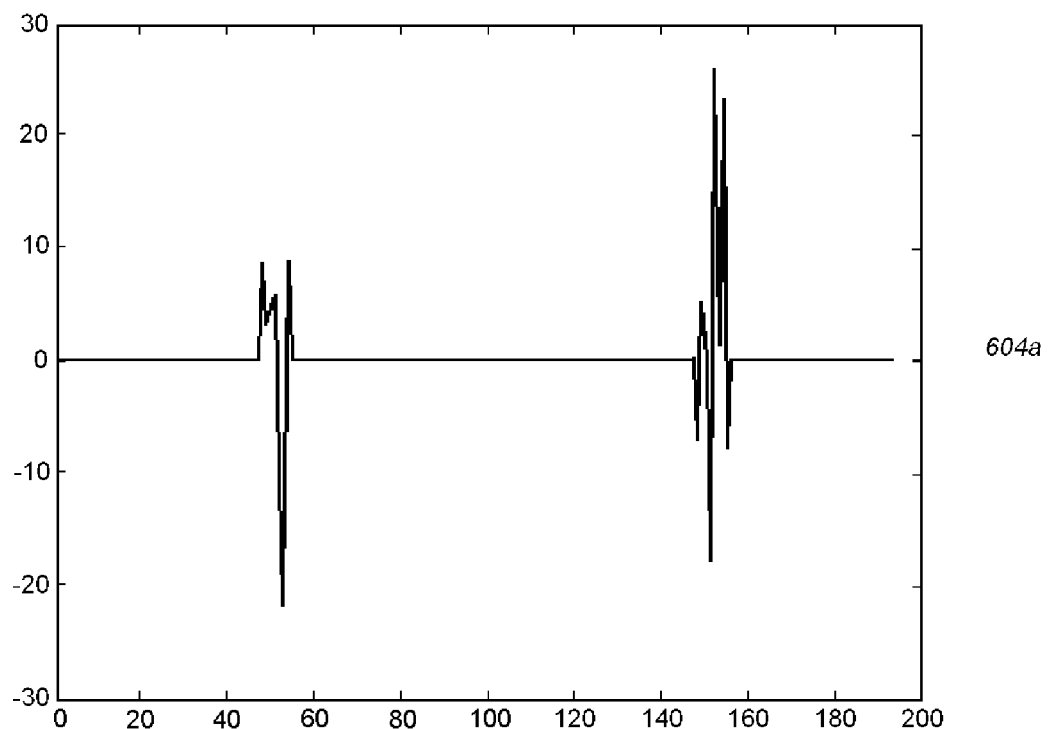
FIG. 6A is graphical diagram showing the plot of the inverse blur, in accordance with an illustrative embodiment.
Figure 6B:
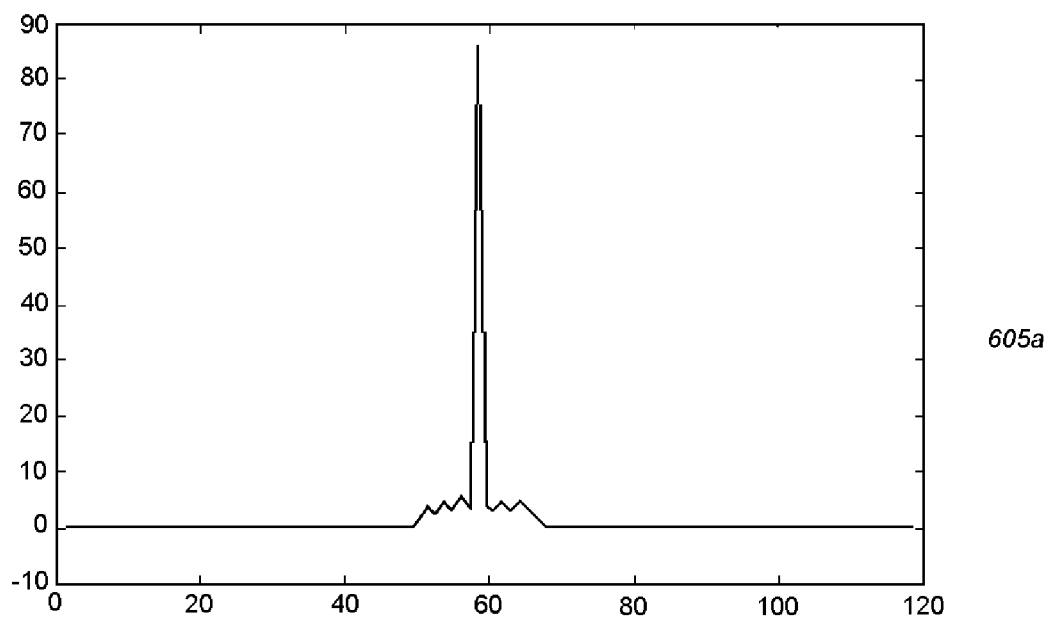
FIG. 6B is a graphical diagram showing a plot of the blur multiplied by the inverse, in accordance with an illustrative embodiment.

Reference is now made to FIGS. 6A and 6B showing graphical diagrams of the plot of the inverse blur and the blur multiplied by the inverse, respectively, in accordance with an illustrative embodiment. FIG. 6A shows a plot of the inverse blur 604a for the 10 element switching pattern "BBBAB-BAAAA" which has been found to be optimum, according to the method 700 shown and described in greater detail herein. It can be observed from the plot 605a of (Blur*Inverse) that some residual error exists, consistent with the epsilon tolerance constraint. It can be further observed that the inverse blur 604a is relatively sparse and that its coefficients are small, consistent with the minimization of the L1-norm, leading to minimum sensitivity of the inverse blur to image sensor noise.

FIG. 7 is a flow diagram showing a procedure for finding the best temporal switching pattern for the point-spread-function, in accordance with the illustrative embodiments. The pint-spread-function can be the illustrative point-spread-function 602 shown and described hereinabove and having a known length. For descriptive purposes, as in the illustrative embodiment hereinabove, assume that the image is known to move a distance of 10 pixels during the exposure time and that the switching pattern should be balanced, so as to evenly distribute the integration of incident light measurement between two integrating storage sites/buffers. The best switching pattern is the pattern that provides the best solution to the inverse blur transform and that is well-conditioned (i.e. in terms of condition number and/or residual error). One method for finding a well-conditioned switching pattern is shown in FIG. 7. The illustrative procedure commences at step 701 to cycle through all possible switching patterns consistent with the length and balance constraints. Briefly, within the outer loop 701: step 702 uses the candidate switching pattern to generate a blur matrix; step 703 solves for the inverse coefficients; decision steps 704 compares the current L1-norm of the inverse blur to the previously existing minimum values to determine if the current switching pattern represents a better solution. If a better solution is found, then the switching pattern along with the new L1-norm minimum value are saved in step 705, and outer loop 501 continues via decision step 706 until all switching patterns have been evaluated. When all patterns have been evaluated, the method returns the best pattern from step 705 via decision step 706.

It is expressly contemplated that the system and method described above can be implemented so that stored moving image data in the plurality of image storage sites is subject to the image extraction process, or portions thereof, at a time subsequent to image capture, potentially using a remote image processor. The appropriate parameters for computation of the point-spread-function are stored to enable subsequent computation of the blur transform and derivation of the still image therefrom.

Likewise, it is expressly contemplated that the architecture of the transducer array and associated pixels can be varied, relative to the architecture depicted in FIG. 2, which is based generally on a 5-transistor CMOS pixel. In an alternate embodiment, the pixel can be constructed according to a different architecture. For example, the interconnected array can be addressed according to a different connectivity. The diffusion nodes can also be gated by a number of circuit arrangements. The array can be organized with a plurality of pixels in a variety of one-dimensional or two-dimensional arrangements. Where a one-dimensional arrangement is employed, the pixels should typically be oriented along the prevailing direction of motion so as to ensure capture of the motion image. In alternate embodiments, the pinned photodiode can be otherwise arranged to provide two or more discrete signals to discrete integrating storage sites. Likewise, while the switching pattern is described as including two states corresponding to a signal directed to either of the two integrating storage sites, it is contemplated that three or more switching pattern states can exist, directed to three or more integrating storage sites.

It is understood that there may exist time periods during the switching between integrating storage buffers in which the signal is received at both storage buffers, or neither storage site receives a signal due to due to latency in the electronic components. It is also understood that one may deliberately introduce a period in which the signal does not reach any integrating storage site, or is not read. However, the provision of two or more integrating storage sites or buffers, notwithstanding such inherent or deliberate introduction of an additional period in which no stored signal exists, still provides a novel arrangement according to the teachings of this invention.

Also, the image transducer, integrating storage sites/buffers and other electronic hardware components described herein can be implemented variously as separate components joined by leads or cabling, or as part of a single chip or chipset as desired. Such a single chip or chipset (not shown) can include other vision processing components for storing and manipulating object or scene feature information.

In summary, it should be clear that the above-described system and method provides various advantages over prior deblurring solutions. By switching between two or more integrating storage sites, the amount of light captured from the object or scene is substantially increased when compared with single-storage site systems that employ shutter coding in the acquisition of the moving image. This allows for reduced exposure time, a smaller aperture for greater depth of field, and/or an increased likelihood that a constant velocity assumption for the object or scene is valid. Moreover, the resultant reduction in size of the point-spread-function array allows for less computational overhead in computing the blur transform and deriving the extracted still image.

The foregoing has been a detailed description of illustrative embodiments of the invention. Various modifications and additions can be made without departing from the spirit and scope of this invention. Each of the various embodiments described above may be combined with other described embodiments in order to provide multiple features. Furthermore, while the foregoing describes a number of separate embodiments of the apparatus and method of the present invention, what has been described herein is merely illustrative of the application of the principles of the present invention. For example, a variety of additional filtering processes and statistical smoothing functions can be applied to the image data to further enhance the fidelity/sharpness of the estimated original image. In one example, the image data is subjected to multiple convolution steps in the image extraction process. Moreover, while the illustrative embodiment depicts blur defined in the moving image mainly as a result of object motion, it is expressly contemplated that the principles herein are applicable to camera motion relative to the object and/or a combination of object and camera motion. In general, the teachings herein can be performed using hardware, software that comprises computer-readable program instructions, or a combination of hardware and software. Accordingly, this description is meant to be taken only by way of example, and not to otherwise limit the scope of this invention.

What is claimed is:

1. A system for acquiring a still image from an input moving image, comprising:
    a) an imaging assembly including a plurality of pixels, each of the pixels comprising a photosensitive element and a plurality of integrating storage sites, each of the pixels being constructed and arranged to direct a measurement of light impinging on the photosensitive element to any one of the plurality of integrating storage sites;
    b) an image capture process that forms a temporally decomposed representation of the moving image in an exposure time interval by directing, according to a predetermined temporal switching pattern, the measurement of light impinging on each of the photosensitive elements among the plurality of integrating storage sites, such that the temporally decomposed image is formed with a temporally decomposed point-spread-function having an inverse transformation that is optimally well-conditioned; and
    c) an image extraction process that applies the inverse transformation of the temporally decomposed point-spread-function to the temporally decomposed image to form a motion-blur free digital image.

2. The system as set forth in claim 1 wherein the photosensitive element is a photodiode connected to a first sense node through a first transfer gate and to a second sense node through a second transfer gate, each of the first transfer gate and the second transfer gate being responsive to the input image capture process.

3. The system as set forth in claim 1 wherein the plurality of integrating storage sites include at least a third integrating storage site, each of the pixels being constructed an arranged to direct the measurement of light impinging on the photosensitive element to the at least third storage site according to the temporal switching pattern.

4. The system as set forth in claim 1 wherein the temporal switching pattern is selected to at least one of (a) minimize attenuation of spatial frequencies in the temporally decomposed representation of the moving image; (b) minimize, by the image extraction process, attenuation of spatial frequencies in the still image; (c) provide, by the image capture process and the image extraction process, a still image that contains a filtered set of spatial frequencies; and (d) provide, by the image capture process and the image extraction process a still image having reduced blur.

5. The system as set forth in claim 1 wherein the image extraction process is constructed and arranged to provide a point-spread-function having a plurality of coefficients based upon a linear combination of values stored in the each of the plurality of integrating storage sites.

6. The system as set forth in claim 5 wherein the image extraction process is constructed and arranged to provide a blur matrix based upon the point-spread-function, the blur matrix being based upon a best version of the temporal switching pattern in terms of a residual error and a condition number.

7. The system as set forth in claim 6 wherein the image extraction process is constructed and arranged to determine the best version of the temporal switching pattern by (a) using each of a plurality of candidate temporal switching patterns to respectively generate the blur matrix; (b) solving for a set of blur transform coefficients with respect to each blur matrix respectively; (c) computing respectively the residual error and the condition number with respect to each set of blur coefficients; (d) comparing a current value of the residual error and a current value of the condition number to a previously existing minimum value of the residual error and a previously existing minimal value of the condition number to determine if a current one of the candidate temporal switching patterns represents a better solution for at least one of the residual error and the condition number, and if the current one of the candidate temporal switching patterns represents a better solution, saving the current one of the candidate switching patterns in association with the current value of the residual error and the current value of the condition number;

(e) and, when all of the candidate temporal switching patterns have been used, returning the best version of the temporal switching pattern.

8. The system as set forth in claim 5 wherein the coefficients include both positive and negative values.

9. The system as set forth in claim 1 wherein the moving image is acquired from a moving object operatively connected with an encoder that provides a signal related to movement of the object or scene, the temporal switching pattern being based upon the signal related to the movement.

10. The system as set forth in claim 9, further comprising an object-height-detection assembly constructed and arranged to measure a height of a surface facing the imaging assembly, and based upon the height, varying the temporal switching pattern in conjunction with the signal related to movement of the object provided from the encoder.

11. The system as set forth in claim 10 wherein the height-detection-assembly comprises a light curtain.

12. The system as set forth in claim 10 wherein the height-detection-assembly is constructed and arranged to measure the height based upon at least one of an optical and a sonar measurement.

13. The system as set forth in claim 1 wherein the moving image defines a blurred image and wherein blur therein is caused by at least one of object motion, camera motion, and a combination of object motion and camera motion.

14. A method for extracting a still image from an input moving image, comprising steps of:
a) providing an imaging assembly including a plurality of pixels, each of the pixels comprising a photosensitive element and a plurality of integrating storage sites, each of the pixels being constructed and arranged to direct a measurement of light impinging on the photosensitive element to any one of the plurality of integrating storage sites;
b) forming a temporally decomposed representation of the moving image in an exposure time interval by directing, according to a predetermined temporal switching pattern, the measurement of light impinging on each of the photosensitive elements among the plurality of integrating storage sites, such that the temporally decomposed image is formed with a temporally decomposed point-spread-function having an inverse transformation that is optimally well-conditioned; and
c) operating on the temporally decomposed representation of the moving image to extract the still image.

15. The method as set forth in claim 14, further comprising selecting the temporal switching pattern to, at least one of, (a) minimize attenuation of spatial frequencies in the temporally decomposed representation of the moving image; (b) minimize, by the image extraction process, attenuation of spatial frequencies in the still image; (c) provide, by the image capture process and the image extraction process, a still image that contains a filtered set of spatial frequencies; and (d) provide, by the image capture process and the image extraction process a still image having reduced blur.

16. The method as set forth in claim 15 wherein the step of operating on the temporally decomposed representation includes providing a blur matrix based upon the point-spread-function, and basing the blur matrix upon a best version of the temporal switching pattern in terms of a residual error and a condition number.

17. The method as set forth in claim 16 wherein the step of operating on the temporally decomposed representation includes determining the best version of the temporal switching pattern by (a) using each of a plurality of candidate temporal switching patterns to respectively generate the blur matrix; (b) solving for a set of blur transform coefficients with respect to each blur matrix respectively; (c) computing respectively the residual error and the condition number with respect to each set of blur coefficients; (d) comparing a current value of the residual error and a current value of the condition number to a previously existing minimum value of the residual error and a previously existing minimal value of the condition number to determine if a current one of the candidate temporal switching patterns represents a better solution for at least one of the residual error and the condition number, and if the current one of the candidate temporal switching patterns represents a better solution, saving the current one of the candidate switching patterns in association with the current value of the residual error and the current value of the condition number; (e) and, when all of the candidate temporal switching patterns have been used, returning the best version of the temporal switching pattern.

18. The method as set forth in claim 14, further comprising capturing the moving image from a moving object operatively connected with an encoder that provides a signal related to movement of the object or scene, and basing the temporal switching pattern upon the signal related to the movement.

19. The method as set forth in claim 18, further comprising measuring, with an object-height-detection assembly, a height of a surface facing the imaging assembly, and based upon the height, varying the temporal switching pattern in conjunction with the signal related to movement of the object provided from the encoder.

20. A system for acquiring a still image from an input moving image, comprising:
a) an imaging assembly including a plurality of pixels, each of the pixels comprising a photosensitive element and a plurality of integrating storage sites, each of the pixels being constructed and arranged to direct a measurement of light impinging on the photosensitive element to any one of the plurality of integrating storage sites;
b) an image capture process that forms a temporally decomposed representation of the moving image in an exposure time interval by repeatedly switching the measurement of light impinging on each of the photosensitive elements among the plurality of integrating storage sites according to a predetermined temporal switching pattern, wherein the predetermined temporal switching pattern is the temporal switching pattern that results in a temporally decomposed point-spread-function whose mathematical inverse is maximally sparse; and
c) an image extraction process that operates on the temporally decomposed representation of the moving image to extract the still image.

* * * * *